United States Patent [19]

Merchant et al.

[11] Patent Number: 5,221,493
[45] Date of Patent: Jun. 22, 1993

[54] AZEOTROPIC COMPOSITIONS OF 1,1,2,2,3,3,4,4-OCTAFLUOROBUTANE AND ALCOHOLS OR KETONES

[75] Inventors: Abid N. Merchant, Wilmington, Del.; Allen C. Sievert, Elkton, Md.; Akimichi Yokozeki; Janet C. Sung, both of Wilmington, Del.

[73] Assignee: E. I. Du Pont de Nemours and Company, Wilmington, Del.

[21] Appl. No.: 779,535

[22] Filed: Oct. 18, 1991

[51] Int. Cl.$^5$ .......................... C09K 5/04; C11D 7/30; C11D 7/50; C23G 5/028

[52] U.S. Cl. ......................................... 252/67; 60/651; 62/114; 134/12; 134/31; 134/38; 134/40; 174/17 GF; 174/25 G; 252/8; 252/162; 252/170; 252/171; 252/194; 252/305; 252/364; 252/571; 252/DIG. 9; 264/53; 264/DIG. 5; 521/98; 521/131

[58] Field of Search ................. 252/67, 170, 171, 364, 252/DIG. 9, 8, 194, 305, 571; 62/114; 134/31, 38, 39, 40, 12; 60/651; 174/17 GF, 25 G; 264/53, DIG. 5; 521/98, 131

[56] References Cited

U.S. PATENT DOCUMENTS 3,927,129 12/1975 Haszeldine et al. ......... 260/653.1 R
4,157,979 6/1979 Walters ............................... 252/162
5,073,291 12/1991 Robeck et al. ..................... 252/171

FOREIGN PATENT DOCUMENTS 431458 6/1991 European Pat. Off. .
432672 6/1991 European Pat. Off. .
450308 10/1991 European Pat. Off. .
4002120 1/1990 Fed. Rep. of Germany .
61-26832 6/1986 Japan .
2-222494 9/1990 Japan .

OTHER PUBLICATIONS

Chemical Abstracts vol. 82 No. 19 Abstract No. 118757y 1975 Abstract of Burns et al, *Anaesthesia* vol. 29(4) 1974 pp. 435-444.

*Primary Examiner*—Linda Skaling
*Attorney, Agent, or Firm*—P. Michael Walker

[57] ABSTRACT

Azeotropic mixtures of HFC-338pcc and an alcohol such as methanol, ethanol, isopropanol or N-propanol, or a ketone such as acetone, are disclosed that are useful as cleaning agents, refrigerants, aerosol propellants, heat transfer media, gaseous dielectrics, fire extinguishing agents, expansion agents for polyolefins and polyurethanes, power cycle working fluids, polymerization media, particulate removal fluids, carrier fluids, and displacement drying agents.

6 Claims, No Drawings

AZEOTROPIC COMPOSITIONS OF 1,1,2,2,3,3,4,4-OCTAFLUOROBUTANE AND ALCOHOLS OR KETONES

FIELD OF THE INVENTION

This invention relates to mixtures of fluorinated hydrocarbons and more specifically relates to azeotropic or azeotrope-like compositions comprising 1,1,2,2,3,3,4,4-octafluorobutane (HFC-338ppc, or $CHF_2CF_2CF_2CHF_2$) and an alcohol, such as methanol, ethanol, isopropanol or N-propanol, and to azeotropic or azeotrope-like mixtures of HFC-338ppc and a ketone such as acetone. Such compositions are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a cleaning agent or solvent. Cleaning agents are used, for example, to clean electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent.

Preferably, cleaning agents should have a low boiling point, nonflammability, low toxicity, and high solvency power so that flux and flux-residues can be removed without damaging the substrate being cleaned. Further, it is desirable that the cleaning agents be azeotropic or azeotrope-like so that they do not tend to fractionate upon boiling or evaporation. This behavior is desirable because if the cleaning agent were not azeotropic or azeotrope-like, the more volatile components of the cleaning agent would preferentially evaporate, and would result in a cleaning agent with a changed composition that may become flammable and that may have less-desirable solvency properties, such as lower rosin flux solvency and lower inertness toward the electrical components being cleaned. The azeotropic character is also desirable in vapor degreasing operations because the cleaning agent is generally redistilled and employed for final rinse cleaning.

Fluorinated hydrocarbons are also useful as blowing agents in the manufacture of close-cell polyurethane, phenolic and thermoplastic foams. Insulating foams depend on the use of blowing agents not only to foam the polymer, but more importantly for the low vapor thermal conductivity of the blowing agents, which is an important characteristic for insulation value.

Fluorinated hydrocarbons may also be used as refrigerants. In refrigeration applications, a refrigerant is often lost through leaks during operation through shaft seals, hose connections, solder joints, and broken lines. In addition, the refrigerant may be released to the atmosphere during maintenance procedures on refrigeration equipment. Accordingly, it is desirable to use refrigerants that are pure fluids or azeotropes as refrigerants. Some nonazeotropic blends of refrigerants may also be used, but they have the disadvantage of changing composition when a portion of the refrigerant charge is leaked or discharged to the atmosphere. Should these blends contain a flammable component, they could also become flammable due to the change in composition that occurs during the leakage of vapor from refrigeration equipment. Refrigerant equipment operation could also be adversely affected due to this change in composition and vapor pressure that results from fractionation.

Aerosol products employ both individual halocarbons and halocarbon blends as propellant vapor pressure attenuators in aerosol systems. Azeotropic mixtures, with their constant compositions and vapor pressures are useful as solvents and propellants in aerosols.

Azeotropic or azeotrope-like compositions are also useful as heat transfer media, gaseous dielectrics, fire extinguishing agents, power cycle working fluids such as for heat pumps, an inert medium for polymerization reactions, as a fluid for removing particulates from metal surfaces, and as a carrier fluid that may be used, for example, to place a fine film of lubricant on metal parts.

Azeotropic or azeotrope-like compositions are further useful as buffing abrasive detergents to remove buffing abrasive compounds from polished surfaces such as metal, as displacement drying agents for removing water such as from jewelry or metal parts, as resist-developers in conventional circuit manufacturing techniques employing chlorine-type developing agents, and as strippers for photoresists (for example, with the addition of a chlorohydrocarbon such as 1,1,1-trichloroethane or trichloroethylene).

Some of the fluorinated hydrocarbons that are currently used in these applications have been theoretically linked to depletion of the earth's ozone layer and to global warming. What is needed, therefore, are substitutes for fluorinated hydrocarbons that have low ozone depletion potentials and low global warming potentials.

SUMMARY OF THE INVENTION

The present invention relates to the discovery of azeotropic or azeotrope-like compositions comprising admixtures of effective amounts of 1,1,2,2,3,3,4,4-octafluorobutane (HFC-338pcc, or $CHF_2CF_2CF_2CHF_2$) and an alcohol, such as methanol, ethanol, isopropanol or N-propanol, to form an azeotropic or azeotrope-like composition. Azeotropic or azeotrope-like compositions, or mixtures, of HFC-338pcc and methanol include about 94-98 weight percent HFC-338pcc and about 2-6 weight percent methanol; azeotropic or azeotrope-like compositions of HFC-338pcc and ethanol comprise about 97-99.5 weight percent HFC-338pcc and about 0.5-3 weight percent ethanol; and azeotropic or azeotrope-like compositions of HFC-338pcc and isopropanol comprise about 98-99.5 weight percent HFC-338pcc and about 0.5-2 weight percent isopropanol, all at atmospheric pressure.

The present invention also relates to the discovery of azeotropic or azeotrope-like compositions comprising admixtures of effective amounts of HFC-338pcc and a ketone, such as acetone, to form an azeotropic or azeotrope-like composition.

Compositions of the invention are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

DETAILED DESCRIPTION OF THE INVENTION

The compositions of the instant invention are substantially constant-boiling, azeotropic or azeotrope-like compositions, or mixtures, comprising effective amounts of 1,1,2,2,3,3,4,4-octafluorobutane (HFC-338pcc, or $CHF_2CF_2CF_2CHF_2$, boiling point=44° C.) and an alcohol, such as methanol ($CH_3OH$, boiling point=64.6° C.), ethanol ($CH_3$—$CH_2$—OH, boiling point=78.4° C.), isopropanol (($CH_3)_2$—CHOH, boiling point=82.3° C.), or N-propanol ($CH_3$—$CH_2$—$CH_2OH$, boiling point=97.2° C.), to form an azeotropic or azeotrope-like composition.

Effective amounts of 1,1,2,2,3,3,4,4-octafluorobutane and an alcohol to form an azeotropic or azeotrope-like composition, when defined in terms of weight percent of the components at atmospheric pressure, include the following.

Substantially constant-boiling, azeotropic or azeotrope-like compositions of HFC-338pcc and methanol comprise about 94-98 weight percent HFC-338pcc and about 2-6 weight percent methanol. These compositions boil at about 41.2°+/−0.2° C. at substantially atmospheric pressure. A preferred composition comprises about 95.2 to 97.2 weight percent HFC-338pcc and about 2.8 to 4.8 weight percent methanol. A more preferred composition of the invention is the azeotrope, which comprises about 96.2 weight percent HFC-338pcc and about 3.8 weight percent methanol, and which boils at about 41.2° C. at atmospheric pressure.

Substantially constant-boiling, azeotropic or azeotrope-like compositions of HFC-338pcc and ethanol comprise about 97-99.5 weight percent HFC-338pcc and about 0.5-3 weight percent ethanol. These compositions boil at about 43.7°+/−0.1° C. at substantially atmospheric pressure. A preferred composition is the azeotrope, which comprises about 98.3 weight percent HFC-338pcc and about 1.7 weight percent ethanol, and which boils at about 43.7° C. at atmospheric pressure.

Substantially constant-boiling, azeotropic or azeotrope-like compositions of HFC-338pcc and isopropanol comprise about 98-99.5 weight percent HFC-338pcc and about 0.5-2 weight percent isopropanol. These compositions boil at about 44.6°+/−0.2° C. at substantially atmospheric pressure. A preferred composition comprises about 98.9-99.5 weight percent HFC-338pcc and about 0.5-1.1 weight percent isopropanol. A more preferred composition of the invention is the azeotrope, which comprises about 99.2 weight percent HFC-338pcc and about 0.8 weight percent isopropanol, and which boils at about 44.6° C. at atmospheric pressure.

The compositions of the instant invention also include substantially constant-boiling, azeotropic or azeotrope-like compositions, or mixtures, comprising effective amounts of 1,1,2,2,3,3,4,4-octafluorobutane and a ketone, such as acetone, to form an azeotropic or azeotrope-like composition.

By "azeotropic or azeotrope-like" composition is meant a constant boiling, or substantially constant boiling, liquid admixture of two or more substances that behaves as a single substance. One way to characterize an azeotropic or azeotrope-like composition is that the vapor produced by partial evaporation or distillation of the liquid has substantially the same composition as the liquid from which it was evaporated or distilled, that is, the admixture distills/refluxes without substantial composition change. Constant boiling or substantially constant boiling compositions, which are characterized as azeotropic or azeotrope-like, exhibit either a maximum or minimum boiling point, as compared with that of the nonazeotropic mixtures of the same components.

As used herein, the terms azeotropic and constant boiling are intended to mean also essentially azeotropic or essentially constant boiling. In other words, included within the meaning of these terms are not only the true azeotropes described above, but also other compositions containing the same components in different proportions, which are true azeotropes or are constant boiling at other temperatures and pressures, as well as those equivalent compositions which are part of the same azeotropic or constant boiling system and are azeotrope-like or substantially constant boiling in their properties. As is well recognized in this art, there is a range of compositions which contain the same components as the azeotrope, which not only will exhibit essentially equivalent properties for cleaning, refrigeration and other applications, but which will also exhibit essentially equivalent properties to the true azeotropic composition in terms of constant boiling characteristics or tendency not to segregate or fractionate on boiling.

For purposes of this invention, effective amount is defined as the amount of each component of the inventive compositions that, when combined, results in the formation of an azeotropic or azeotrope-like composition. This definition includes the amounts of each component, which amounts may vary depending upon the pressure applied to the composition, so long as the azeotropic or azeotrope-like, or constant boiling or substantially constant boiling compositions continue to exist at the different pressures, but with possible different boiling points. Therefore, effective amount includes the weight percentage of each component of the compositions of the instant invention, which form azeotropic or azeotrope-like, or constant boiling or substantially constant boiling, compositions at pressures other than atmospheric pressure.

It is possible to characterize, in effect, a constant boiling admixture, which may appear under many guises, depending upon the conditions chosen, by any of several criteria:

The composition can be defined as an azeotrope of A, B and C, since the very term "azeotrope" is at once both definitive and limitative, and requires that effective amounts A, B and C form this unique composition of matter, which is a constant boiling admixture.

It is well known by those skilled in the art that at different pressures, the composition of a given azeotrope will vary—at least to some degree—and changes in pressure will also change—at least to some degree—the boiling point temperature. Thus an azeotrope of A, B and C represents a unique type of relationship but with a variable composition which depends on temperature and/or pressure. Therefore compositional ranges, rather than fixed compositions, are often used to define azeotropes.

The composition can be defined as a particular weight percent relationship or mole percent relationship of A, B and C, while recognizing that such specific values point out only one particular such relationship and that in actuality, a series of such relationships, represented by A, B and C actually exist for a given azeotrope, varied by the influence of pressure.

Azeotrope A, B and C can be characterized by defining the composition as an azeotrope characterized by a boiling point at a given pressure, thus giving identifying characteristics without unduly limiting the scope of the invention by a specific numerical composition, which is limited by and is only as accurate as the analytical equipment available.

The following binary compositions are characterized as azeotropic or azeotrope-like in that compositions within these ranges exhibit a substantially constant boiling point at constant pressure. Being substantially constant boiling, the compositions do not tend to fractionate to any great extent upon evaporation. After evaporation, only a small difference exists between the composition of the vapor and the composition of the initial liquid phase. This difference is such that the compositions of the vapor and liquid phases are considered substantially the same and are azeotropic or azeotrope-like in their behavior.

1. 94–98 weight percent HFC-338pcc and 2–6 weight percent methanol, at substantially atmospheric pressure;
2. 97–99.5 weight percent HFC-338pcc and 0.5–3 weight percent ethanol, at substantially atmospheric pressure; and
3. 98–99.5 weight percent HFC-338pcc and 0.5–2 weight percent isopropanol, at substantially atmospheric pressure;

The following binary compositions of HFC-338pcc and alcohols have been established, within the accuracy of the fractional distillation method, as a true binary azeotropes.

1. about 96.2 weight percent HFC-338pcc and about 3.8 weight percent methanol, boiling point of about 41.2° C. at substantially atmospheric pressure;
2. about 98.3 weight percent HFC-338pcc and about 1.7 weight percent ethanol, boiling point of about 43.7° C. at substantially atmospheric pressure; and
3. about 99.2 weight percent HFC-338pcc and about 0.8 weight percent isopropanol, boiling point of about 44.6° C. at substantially atmospheric pressure;

The aforestated azeotropes have no ozone-depletion potentials, their Global Warming Potentials (GWP) are low and they have short atmospheric life spans, and are expected to decompose almost completely prior to reaching the stratosphere.

The azeotropes or azeotrope-like compositions of the instant invention permit easy recovery and reuse of the solvent from vapor defluxing and degreasing operations because of their azeotropic natures. As an example, the azeotropic mixtures of this invention can be used in cleaning processes such as described in U.S. Pat. No. 3,881,949, or as a buffing abrasive detergent.

Another aspect of the invention is a refrigeration method which comprises condensing a refrigerant composition of the invention and thereafter evaporating it in the vicinity of a body to be cooled. Similarly, still another aspect of the invention is a method for heating which comprises condensing the invention refrigerant in the vicinity of a body to be heated and thereafter evaporating the refrigerant.

A further aspect of the invention includes aerosol compositions comprising an active agent and a propellant, wherein the propellant is an azeotropic mixture of the invention; and the production of these compositions by combining said ingredients. The invention further comprises cleaning solvent compositions comprising the azeotropic mixtures of the invention.

The azeotropic or azeotrope-like compositions of the instant invention can be prepared by any convenient method including mixing or combining the desired component amounts. A preferred method is to weigh the desired component amounts and thereafter combine them in an appropriate container.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, are hereby, incorporated by reference.

EXAMPLE 1

A solution which contained 95.97 weight percent HFC-338pcc and 4.03 weight percent methanol was prepared in a suitable container and mixed thoroughly.

The solution was distilled in a twenty-five plate Oldershaw distillation column, using a 15:1 reflux to take-off ratio. Head and pot temperatures were read directly to 0.1° C. The pressure was at 757.2 mmHg. Distillate compositions were determined by gas chromatography. Results obtained are summarized in Table 1.

TABLE 1

| | DISTILLATION OF (95.97 + 4.03) HFC-338pcc AND METHANOL (MEOH) | | | | |
|---|---|---|---|---|---|
| | TEMPERATURE, °C. | | WT. % DISTILLED OR | WEIGHT PERCENTAGES | |
| CUTS | POT | HEAD | RECOVERED | HFC-338pcc | MEOH |
| PRE | 41.4 | 40.9 | 7.9 | 96.6 | 3.4 |
| 1 | 41.5 | 41.1 | 16.6 | 96.4 | 3.6 |
| 2 | 41.5 | 41.1 | 21.6 | 96.3 | 3.7 |
| 3 | 41.5 | 41.2 | 31.4 | 96.2 | 3.8 |
| 4 | 41.9 | 41.2 | 41.0 | 96.2 | 3.8 |
| 5 | 49.4 | 41.2 | 53.2 | 96.1 | 3.9 |
| 6 | 70.9 | 41.2 | 64.2 | 96.1 | 3.9 |
| HEEL | — | — | 97.4 | 86.0 | 14.0 |

Analysis of the above data indicates very small differences between head temperatures and distillate compositions as the distillation progressed. A statistical analysis of the data indicates that the true binary azeotrope of HFC-338pcc and methanol has the following characteristics at atmospheric pressure (99 percent confidence limits):

HFC-338pcc = 96.2 +/− 0.3 wt. %
methanol = 3.8 +/− 0.3 wt. %
Boiling point, °C. = 41.2 +/− 0.2° C.

EXAMPLE 2

A solution containing 95.73 weight percent HFC-338pcc and 4.27 weight percent ethanol was prepared in a suitable container and mixed thoroughly.

The solution was distilled in a twenty-five plate Oldershaw distillation column using a 15:1 reflux to take-off ratio. Head and pot temperatures were read directly to 0.1° C. The pressure was between 757.2 and 757.7 mmHg. Distillate compositions were determined by gas chromatography. Results obtained are summarized in Table 2.

TABLE 2

DISTILLATION OF: (95.73 + 4.27) HFC-338pcc AND ETHANOL (ETOH)

| CUTS | TEMPERATURE, °C. POT | TEMPERATURE, °C. HEAD | WT. % DISTILLED OR RECOVERED | WEIGHT PERCENTAGES HFC-338pcc | WEIGHT PERCENTAGES ETOH |
|------|------|------|------|------|------|
| PRE  | 44.0 | 43.6 | 9.1  | 98.3 | 1.7 |
| 1    | 44.1 | 43.7 | 18.9 | 98.3 | 1.7 |
| 2    | 44.2 | 43.7 | 25.3 | 98.3 | 1.7 |
| 3    | 44.6 | 43.7 | 34.2 | 98.3 | 1.8 |
| 4    | 46.0 | 43.7 | 44.5 | 98.3 | 1.8 |
| 5    | 47.6 | 43.7 | 59.4 | 98.3 | 1.8 |
| 6    | 63.1 | 43.7 | 70.6 | 98.3 | 1.7 |
| HEEL | —    | —    | 92.6 | 87.6 | 12.4 |

Analysis of the data from this Example indicated very small differences between head temperatures and distillate compositions, as the distillation progressed. A statistical analysis of the data indicated that the true binary azeotrope of HFC-338pcc and ethanol has the following characteristics at atmospheric pressure (99 percent confidence limits):

HFC-338pcc = 98.3 +/− 0.04 wt. %
Ethanol = 1.7 +/− 0.04 wt. %
Boiling point, °C. = 43.7 +/− 0.1° C.

EXAMPLE 3

A solution containing 97.16 weight percent HFC-338pcc and 2.84 weight percent isopropanol was prepared in a suitable container and mixed thoroughly.

The solution was distilled in a five plate Oldershaw distillation column using a 5:1 reflux to take-off ratio. Head and pot temperatures were read directly to 0.1° C. The pressure was about 763.8 mmHg. Distillate compositions were determined by gas chromatography. Results obtained are summarized in Table 3.

TABLE 3

DISTILLATION OF (97.16 + 2.84) HFC-338pcc AND ISOPROPANOL (IPA)

| CUTS | TEMPERATURE, °C. POT | TEMPERATURE, °C. HEAD | WT. % DISTILLED OR RECOVERED | WEIGHT PERCENTAGES HFC-338pcc | WEIGHT PERCENTAGES MEOH |
|------|------|------|------|------|------|
| PRE  | 44.5 | 45.2 | 9.5  | 99.4 | 0.6 |
| 1    | 44.5 | 45.4 | 23.7 | 99.3 | 0.7 |
| 2    | 44.6 | 46.1 | 41.9 | 99.2 | 0.8 |
| 3    | 44.6 | 47.0 | 57.9 | 99.2 | 0.8 |
| 4    | 44.6 | 49.3 | 68.9 | 99.1 | 0.9 |
| 5    | 44.8 | 63.3 | 81.9 | 98.8 | 1.2 |
| 6    | 44.9 | 80.7 | 85.1 | 98.5 | 1.5 |
| HEEL | —    | —    | 89.6 | 76.7 | 23.3 |

Analysis of the data from this Example indicated very small differences between head temperatures and distillate compositions, as the distillation progressed. A statistical analysis of the data indicated that the true binary azeotrope of HFC-338pcc and isopropanol has the following characteristics at atmospheric pressure (99 percent confidence limits):

HFC-338pcc = 99.2 +/− 0.3 wt. %
Isopropanol = 0.8 +/− 0.3 wt. %
Boiling point, °C. = 44.6 +/− 0.2° C.

EXAMPLE 4

Several single sided circuit boards were coated with activated rosin flux and soldered by passing the boards over a preheater, to obtain top side board temperatures of approximately 200° F., and then through 500° F. molten solder. The soldered boards were defluxed separately with the azeotropic mixtures cited in Example 1 by suspending a circuit board for three minutes in a boiling sump that contained the azeotropic mixture then for one minute in a rinse sump that contained the same azeotropic mixture and, finally, for one minute in the solvent vapor above the boiling sump. The boards cleaned in each azeotropic mixture had no visible residue remaining thereon.

ADDITIONAL COMPOUNDS

Other components, such as aliphatic hydrocarbons having a boiling point of 35°–85° C., hydrofluorocarbonalkanes having a boiling point of 35°–85° C., hydrofluoropropanes having a boiling point of between 35°–85° C., hydrocarbon esters having a boiling point between 30°–80° C., hydrochlorofluorocarbons having a boiling point between 25°–85° C., hydrofluorocarbons having a boiling point of 25°–85° C., hydrochlorocarbons having a boiling point between 35°–85° C., chlorocarbons and perfluoroinated compounds, can be added to the azeotropic or azeotrope-like compositions described above without substantially changing the properties thereof, including the constant boiling behavior, of the compositions. Examples of such components, which typically do not exceed about 10 weight percent of the total composition, include the following.

| COMPOUND | FORMULA | boiling point °C. |
|----------|---------|-------------------|
| HFCF-123 | $CHCl_2CF_3$ | 27 |
| HCFC-141b | $CFCl_2CH_3$ | 32 |
| HCFC-225aa | $CHF_2CCl_2CF_3$ | 53 |
| HCFC-225ca | $CHCl_2CF_2CF_3$ | 52 |
| HCFC-225cb | $CHClFCF_2CF_2Cl$ | 56 |
| HCFC-225da | $CClF_2CHClCF_3$ | 50 |
| HFC-43-10 mf | $CF_3CH_2CF_2CF_2CF_3$ | 52 |
| HFC-43-10mcf | $CF_3CF_2CH_2CF_2CF_3$ | 52 |
| FC-C-51-12 | cyclo-$C_4F_6(CF_3)_2$ | 45 |
|  | $CH_3OCF_2CHFCF_3$ | 52 |
| HFC-C-456myc | cyclo-$CH_2CH_2CF_2CF(CF_3)$ |  |
| HFC-C-354 | cyclo-$CF_2CF_2CH_2CH_2$ | 50 |
|  | $C_4F_9CH=CH_2$ | 58 |
| MEK | $CH_3C(O)C_2H_5$ | 80 |
| THF | cyclo-$OC_4H_8$ | 66 |
| methyl formate | $HC(O)OCH_3$ | 32 |
| ethyl formate | $HC(O)OC_2H_5$ | 54 |
| methyl acetate | $CH_3C(O)OCH_3$ | 56 |
| ethyl acetate | $CH_3C(O)OC_2H_5$ | 77 |
| cyclohexane |  | 81 |
| hexane |  | 69 |
| cyclopentane |  | 49 |
| acetone[1] |  | 56 |
| 1,2-dichloroethane |  | 84 |
| acetonitrile |  | 82 |
| methylene chloride |  | 40 |

[1] Added to the HFC-338pcc/alcohol azeotrope or azeotrope-like compositions only.

Additives such as lubricants, corrosion inhibitors, stabilizers, surfactants, dyes and other appropriate materials may be added to the novel compositions of the invention for a variety of purposes provided they do not have an adverse influence on the composition, for their intended applications. Examples of stabilizers include nitromethane and nitroethane.

We claim:

1. An azeotropic or azeotrope-like composition consisting essentially of about 97 to 99.5 weight percent 1,1,2,2,3,3,4,4-octafluorobutane and about 0.5 to 3 weight percent ethanol wherein the composition boils at about 43.7° C. when the pressure has been adjusted to substantially atmospheric pressure.

2. The azeotropic or azeotrope-like composition of claim 1, consisting essentially of about 98.3 weight percent 1,1,2,2,3,3,4,4-octafluorobutane and about 1.7 weight percent ethanol wherein the composition boils at about 43.7° C. when the pressure has been adjusted to substantially atmospheric pressure.

3. An azeotropic or azeotrope-like composition consisting essentially of about 98.0 to 99.5 weight percent 1,1,2,2,3,3,4,4-octafluorobutane and about 0.5 to 2.0 weight percent isopropanol wherein the composition boils at about 44.6° C. when the pressure has been adjusted to substantially atmospheric pressure.

4. The azeotropic or azeotrope-like composition of claim 3, consisting essentially of about 99.2 weight percent 1,1,2,2,3,3,4,4-octafluorobutane and about 0.8 weight percent isopropanol wherein the composition boils at about 44.6° C. when the pressure has been adjusted to substantially atmospheric pressure.

5. A process for cleaning a solid surface comprising treating said surface with an azeotropic or azeotrope-like composition of any one of claims 1 through 4.

6. A process for producing refrigeration, comprising condensing an azeotropic or azeotrope-like composition of any one of claims 1 through 4, and thereafter evaporating said composition in the vicinity of a body to be cooled.

* * * * *